US011893714B2

United States Patent
Ramanathan et al.

(10) Patent No.: US 11,893,714 B2
(45) Date of Patent: Feb. 6, 2024

(54) PRECIPITATION REMOVAL FROM VIDEO

(71) Applicant: ObjectVideo Labs, LLC, Tysons, VA (US)

(72) Inventors: Narayanan Ramanathan, Chantilly, VA (US); Dana Eubanks, Tysons, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 241 days.

(21) Appl. No.: 17/323,371

(22) Filed: May 18, 2021

(65) Prior Publication Data

US 2021/0374967 A1 Dec. 2, 2021

Related U.S. Application Data

(60) Provisional application No. 63/033,282, filed on Jun. 2, 2020.

(51) Int. Cl.
*G06T 5/00* (2006.01)
*G06T 7/13* (2017.01)
(Continued)

(52) U.S. Cl.
CPC .......... *G06T 5/005* (2013.01); *G06F 18/2413* (2023.01); *G06T 7/12* (2017.01);
(Continued)

(58) Field of Classification Search
CPC .. G06T 5/005; G06T 7/12; G06T 7/13; G06T 7/194; G06T 2207/30192;
(Continued)

(56) References Cited

U.S. PATENT DOCUMENTS

2004/0153225 A1* 8/2004 Stam .................... B60Q 1/143
702/127
2008/0187219 A1 8/2008 Chen et al.
(Continued)

OTHER PUBLICATIONS

Bossu, J., Hautiere, N. and Tarel, J.P., 2011. Rain or snow detection in image sequences through use of a histogram of orientation of streaks. International journal of computer vision, 93, pp. 348-367.*
(Continued)

*Primary Examiner* — Zhitong Chen
(74) *Attorney, Agent, or Firm* — Fish & Richardson P.C.

(57) ABSTRACT

Methods, systems, and apparatus for removing precipitation from video are disclosed. A method includes generating, from a first set of images of a scene from a camera, a segmented background image model of the scene; obtaining a second set of images from the camera; identifying, in an image of the second set of images, a plurality of edges, determining that a first edge of the plurality of edges satisfies criteria for representing precipitation based at least in part on determining that the first edge (i) does not correspond to the background image model of the scene and (ii) extends into two or more contiguous segments of the scene; in response, classifying each of the contiguous segments as a precipitation segment; generating pixel data for each of the precipitation segments; and applying the pixel data to each precipitation segment in the image.

19 Claims, 5 Drawing Sheets

(51) Int. Cl.
*G06T 7/194* (2017.01)
*G06T 7/12* (2017.01)
*G06F 18/2413* (2023.01)
*G06V 10/50* (2022.01)
*G06V 10/44* (2022.01)
*G06V 20/52* (2022.01)

(52) U.S. Cl.
CPC ................ *G06T 7/13* (2017.01); *G06T 7/194* (2017.01); *G06V 10/44* (2022.01); *G06V 10/50* (2022.01); *G06V 20/52* (2022.01); *G06T 2207/30192* (2013.01)

(58) Field of Classification Search
CPC ............. G06T 2207/20021; G06T 5/50; G06F 18/2413; G06V 10/44; G06V 10/50; G06V 20/52
See application file for complete search history.

(56) References Cited

U.S. PATENT DOCUMENTS

2011/0103648 A1  5/2011  Wiedemann et al.
2016/0148383 A1  5/2016  Cerqueira et al.

OTHER PUBLICATIONS

Chen, J., Tan, C.H., Hou, J., Chau, L.P. and Li, H., 2018. Robust video content alignment and compensation for rain removal in a cnn framework. In Proceedings of the IEEE conference on computer vision and pattern recognition (pp. 6286-6295).*
PCT International Search Report and Written Opinion in International Appln. No. PCT/US2021/033593, dated Aug. 26, 2021, 7 pages.
Extended European Search Report in European Appln. No. 21817621.2, dated Nov. 7, 2023, 11 pages.
Kim et al., "Multi-frame de-raining algorithm using a motion-compensated non-local mean filter for rainy video sequences," J. Vis. Commun. Image R., Jan. 1, 2015, 26:317-328.
Xue et al., "Motion robust rain detection and removal from videos," Multimedia Signal Processing (MMSP), IEEE 14th International Workshop on, IEEE, Sep. 17, 2012, pp. 170-174.

* cited by examiner

EDGES OF SECOND SET OF IMAGES

PRECIPITATION SEGMENTS

FOREGROUND EDGES

PRECIPITATION INTENSITY

PRECIPITATION REMOVAL FROM VIDEO

CROSS-REFERENCE TO RELATED APPLICATIONS

This application claims the benefit of the U.S. Provisional Patent Application No. 63/033,282 filed Jun. 2, 2020, which is incorporated herein by reference in its entirety.

TECHNICAL FIELD

This disclosure application relates generally to surveillance cameras.

BACKGROUND

Many properties are equipped with monitoring systems that include sensors and connected system components. Some property monitoring systems include cameras.

SUMMARY

Techniques are described for precipitation removal from video.

Precipitation, e.g., rain, snow, sleet, and hail, can be visible in camera images as thin white lines, streaks, or curves. Precipitation can be especially visible in infrared images, such as infrared images captured at night when a camera is in infrared mode. For camera images that are analyzed using video analysis, the lines caused by precipitation can intersect with virtual line crossings and areas of interest in a camera scene, and can trigger false camera alerts. For example, the lines caused by precipitation may be detected as motion in the area of interest or an object crossing a virtual line.

Many residents and homeowners equip their properties with monitoring systems to enhance the security, safety, or convenience of their properties. A property monitoring system can include one or more cameras that can obtain visual images of scenes at the property. A camera can be incorporated into a component of the property monitoring system, e.g., a doorbell camera.

A camera can detect events and generate alerts to send to a resident of a property based on the detected events. In some examples, events detected by the camera can trigger the property monitoring system to perform one or more actions. For example, events that meet pre-programmed criteria may trigger the property monitoring system to send a notification to a resident of the property or to adjust a setting of the property monitoring system It is desirable for the resident to receive alerts that are of interest to the resident, and to reduce the number of false alerts, or non-interest alerts, sent to the resident. To reduce false alerts, the camera can be configured to filter out images of precipitation.

To filter out images of precipitation, a camera system can first analyze images of a scene captured by the camera to generate a segmented background model. Once the camera generates the background model of the scene, the camera can analyze images captured by the camera to identify edges of objects in the scene that do not correspond with the background model, e.g., foreground edges.

Upon identifying the foreground edges, the camera can identify a subset of foreground edges that represent precipitation. If a foreground edge meets criteria for representing precipitation, the camera can classify the foreground edge as a precipitation edge. A precipitation edge may cross through multiple contiguous segments of the image. The camera can classify the segments of the image that include the precipitation edge as precipitation segments.

The camera can analyze pixel data of the precipitation segments to generate modified pixel values for each pixel of the precipitation segments. The camera can then replace pixel data for each pixel of the precipitation segments with modified pixel values. The modified pixel values can reduce, erase, or remove the precipitation from the images. The camera can output modified images, e.g., to a display, to a video analysis system, or both.

Removing precipitation from video images can reduce false positive alerts with video analysis that may be triggered by depictions of precipitation. Removing precipitation from video images can also improve object detection and tracking using video analysis. Removing precipitation from video images can also improve the appearance of the images when viewed by a user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
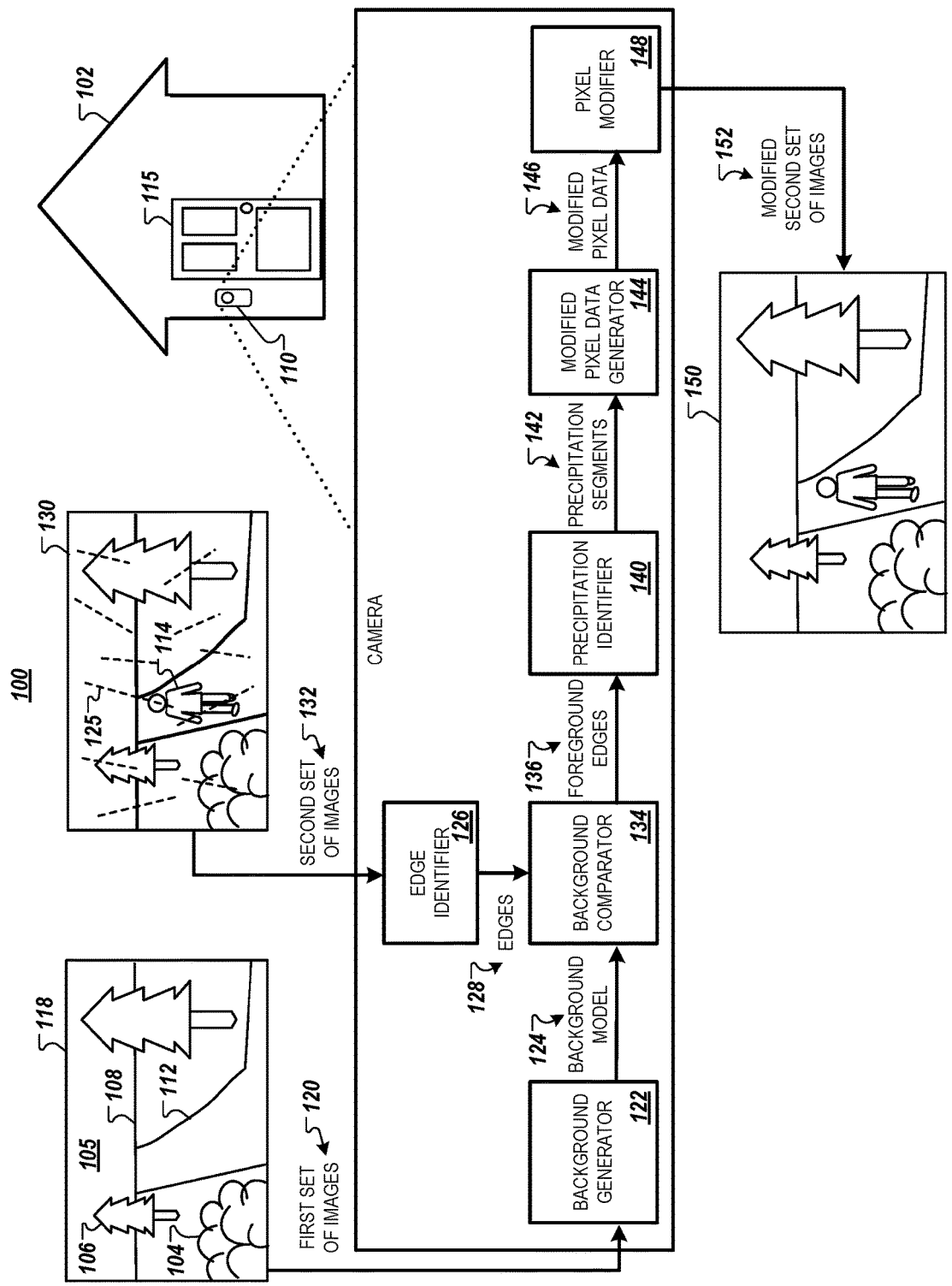
FIG. 1 illustrates an example system for precipitation removal from video using a camera.

FIG. 1 illustrates an example system 100 for precipitation removal from video. The system 100 includes a camera 110 installed at a property 102. The property 102 can be a home, another residence, a place of business, a public space, or another facility that has one or more cameras 110 installed.

The camera 110 is shown in FIG. 1 as a component of a doorbell that is installed external to the property 102. In some examples, the camera 110 may be separate from the doorbell. For example, the camera 110 may be installed a few inches or a few feet from the doorbell. In some examples, the system 100 includes the camera 110 and might not include the doorbell.

The camera 110 is installed near a front door 115 of the property 102. In some examples, the camera 110 is a component of a monitoring system that collects data from various sensors in order to monitor conditions and events at the property 102.

The camera 110 captures video from a scene within a field of view. The video can include multiple consecutive camera images, or frames, of the scene. The video can include any type of images. For example, the video can include visual light images, infrared images, or radio wave images. In some examples, the video can include a combination of one or more types of images, e.g., visual light images with infrared illumination.

The field of view is an area that is observable by the camera 110. The camera 110 has a field of view that includes the area near the property 102. The field of view includes a yard 108, a driveway 112, bushes 104, sky 105, and trees 106 in front of the property 102.

In some examples, the camera 110 can capture video continuously. In some examples, the camera 110 can capture video when triggered by an event. For example, the camera 110 may capture video when triggered by depression of a button on the doorbell. In some examples, the camera 110 may capture video when triggered by activation of a motion sensor or other sensor in communication with the camera 110.

The camera 110 may capture video for a preprogrammed amount of time. For example, when triggered by depression of the button on the doorbell, the camera 110 may capture video for a preprogrammed time of ten seconds, thirty seconds, or sixty seconds. When triggered by a motion sensor, the camera 110 may capture video for a preprogrammed time and/or may capture video until the motion sensor no longer detects motion.

The camera 110 can perform video analysis on captured video. Video analysis can include detecting, identifying, and tracking objects in the video. The camera 110 may include an object detector that can detect the presence of moving objects within a frame. When the object detector detects an object, the object detector can create a bounding box around the image of the object in the frame. The camera 110 may include an object tracker that can track object movement from one frame to a consecutive frame. The object tracker can track the bounding boxes of existing objects in each subsequent frame.

The camera 110 can detect events and generate alerts to send to a resident of a property based on the detected events. For example, the camera 110 can detect the presence of objects of interest, e.g., humans, in the field of view. The camera 110 can generate alerts based on the detected presence of objects of interest. The camera 110 can also generate alerts based on movements of objects of interest. For example, the camera 110 may generate an alert based on an object of interest approaching within a certain range to the camera 110. The camera 110 may be programmed with virtual line crossings. When an object crosses the virtual line crossing, the camera 110 can generate an alert.

In the example of FIG. 1, the camera 110 captures a first set of images 120. The first set of images 120 can be, for example, a set of infrared images. Infrared images are often shown in grayscale. In grayscale, hotter objects can be represented by lighter pixel shading, while cooler objects can be represented by darker pixel shading. Though the example of FIG. 1 will be described for an example of grayscale infrared images, the techniques described can also be applied to other types of images. For example, the techniques described can be applied to visible light images in color or grayscale, or to infrared images with false color.

The pixel value of each pixel of an image determines the light intensity of the pixel when displayed. The pixel value for each pixel can be a value between, for example 0 and 255 for an 8-bit grayscale image. In some examples, the pixel value can be represented as a percentage, e.g., with zero percent appearing as black, and one hundred percent appearing as white. In an infrared image, the pixel value is related to the detected heat of the object depicted by the pixel. For example, a pixel value of 200 may represent a greater heat intensity, and be displayed with a lighter shading, compared to a pixel value of 100.

The first set of images 120 includes an image 118. The image 118 includes depictions of objects that make up a background scene within the field of view of the camera 110. For example, the image 118 includes depictions of a background scene that includes the driveway 112, bush 104, yard 109, and trees 106.

The first set of images 120 can be a set of images selected by the camera 110 for use in generating a background model 124. The camera 110 can select the first set of images 120 based on pre-programmed criteria. Criteria can include, for example, illumination level of the camera images, absence of moving objects in the camera images, and stillness of the camera 110.

The camera 110 may select the camera images based on illumination level criteria. In some examples, the camera 110 selects a number of camera images captured during a time period, e.g., an hour, a day, or a week. In some examples, the camera 110 can select camera images captured at various times of day when illumination is above a threshold illumination. To determine if the illumination is above the threshold illumination, the camera 110 can convert red-green-blue (RGB) image data for the camera image to luminance (LUV) data and extract the "L" value. If the median value of L is above a threshold value, e.g., one hundred, the camera 110 can classify the camera image as "well illuminated."

The camera 110 may select the camera images based on an absence of moving objects. For example, the camera 110 can run a pre-trained object detector on camera images captured during a time period. In some examples, the camera 110 may run the object detector on the camera images after determining that the camera images are well illuminated, as described above. The object detector can identify objects in the camera images and can generate a bounding box around each object. The bounding box can be an area of the camera image where the object is positioned, and can coarsely outline the object using, for example, a rectangular shape. Once the camera 110 has generated the bounding boxes around the objects, the camera 110 can track movement of the objects by tracking movement of the bounding boxes. The camera 110 can then select images that do not include moving objects, e.g., that do not include moving people, vehicles, or animals.

The camera 110 may select the camera images based on stillness of the camera 110. For example, the camera 110 can run a feature-matching algorithm between image frames captured by the camera to determine if movement occurred between the image frames. In some examples, the camera 110 can run a scale-invariant feature transform (SIFT) algorithm on camera images captured during a time period. In some examples, the camera 110 may run the SIFT algorithm on the camera images after determining that the camera images are well illuminated, after determining that the camera images do not include moving objects, or both. Based on results of the feature-matching algorithm, the camera 110 can determine if the camera 110 underwent a movement drift while capturing the images, or if the camera 110 remained still. The camera 110 can then select images that were captured while the camera 110 was still.

In some examples, the camera 110 can generate the background model 124 at pre-programmed intervals, e.g., once per day, or once per week. In some examples, the camera 110 can generate the background model 124 occasionally, e.g., in response to the camera 110 moving. For example, a resident of the property 102 may occasionally reposition the camera 110, or wind may cause the camera 110 to move. In some examples, the camera 110 can reposition automatically, e.g., in response to detecting events in a certain portion of the field of view, or in response to a portion of the field of view being obstructed. The camera 110 can include a SIFT threshold for triggering re-determination of the background model 124. For example, the SIFT threshold may be the camera 110 repositioning by five degrees or more. If the camera 110 moves an amount greater than the SIFT threshold, the camera 110 can generate a new background model 124 from the new camera images.

In some examples, the first set of images 120 can include multiple images captured in sequence. For example, the first set of images 120 can include five, seven, or fifteen images captured in sequence. In some examples, the first set of images 120 can include multiple images captured at different times. For example, the first set of images 120 can include multiple images captured at different times of day, or on different days.

The background generator 122 can generate the background model 124 based on the first set of images 120. The background generator 122 can be any appropriate type of background generator. The background generator can model the background of the scene using methods including, for example, frame-differencing methods, Gaussian mixture methods, kernel density estimation, and parametric and non-parametric modeling.

In some examples, the background generator 122 can use edge detection methods to generate the background model 124. Using edge detection methods, the background generator 122 can identify edges of the scene.

An edge can be a boundary of an object depicted in a scene. For example, the image 118 includes edges at boundaries between the driveway 112 and the yard 108, between the trees 106 and the yard, and between the trees 106 and the sky 105. In some examples, an edge can be identified based on contrast between pixel values of adjacent pixels of an image. For example, pixels of a depiction of precipitation may have high pixel values compared to pixel values of a depiction of the sky. The boundary between the higher pixel values and the lower pixel values can be identified as an edge.

The background generator 122 can divide the scene into segments, or cells. For example, the background generator 122 can overlay a grid on the scene. The grid can be, for example, a grid of rectangular or hexagonal cells. The cells of the grid can be of uniform size and shape.

The background generator 122 can compute edges that appear in each cell of the grid. The background generator 122 can identify a length of each edge and an angle of each edge. The length of an edge can be measured, for example, by a number of pixels included in the edge.

Figure 2A:
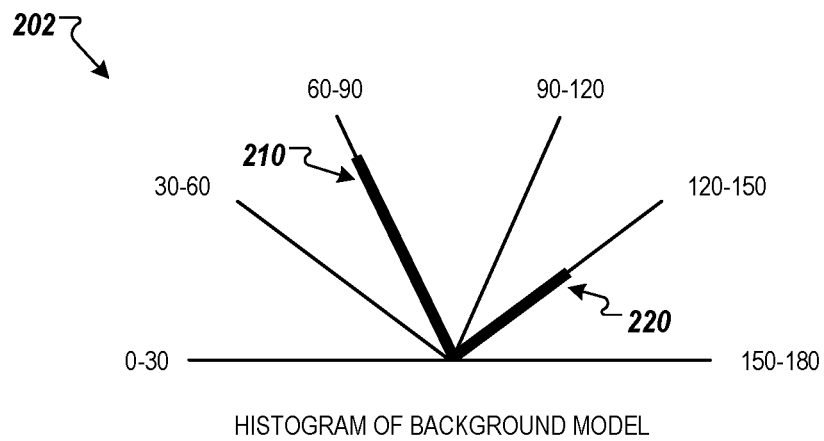
FIG. 2A to 2C show example visualizations of edge angles of images.

The background generator 122 generates the background model 124. The background model 124 can include the identified edges of the scene. FIG. 2A shows a visualization of the edges of the background model 124. Specifically, FIG. 2A shows an example histogram 202 for the edges in an example cell of the background model 124.

The histogram 202 shows the edges separated into "bins." Each bin includes a thirty-degree range of angles. The bins can correspond to an angle of the edges. The angle of the edges can be defined in reference to a reference direction at zero degrees, e.g., horizontal to the left. A reciprocal of the reference direction is then one hundred-eighty degrees, e.g., horizontal to the right.

Though the example histogram 202 includes six bins, other numbers and sizes of bins are possible. For example, the edges can be separated into three bins, each including a sixty degree range of angles. In another example, the edges can be separated into nine bins, each including a twenty degree range of angles.

In some examples, the number and size of the bins can vary based on the camera's field of view. The number and size of the bins can be adjusted to accommodate distortion of images captured by the camera. For example, the number and size of the bins can be adjusted to accommodate wide field of view lenses, such as fisheye lenses.

In some examples, the angle of the edges can be defined in reference to a vertical or diagonal direction, instead of in reference to a horizontal direction. In some examples, the reference direction can be different for some segments of an image than for other segments of the image. For example, for a wide angle lens such as a fisheye lens, the reference direction may be a horizontal direction for a segment of the image near the center of the image, and may be a diagonal direction for a segment of the image that is away from the center of the image.

The edge pixels of the background model 124 can be divided into bins, e.g., six bins, according to the angle, or orientation, of the edge. Each of the six bins can include orientations within a range of thirty degrees, and their reciprocal orientations. For example, a first bin can include pixels with flow orientation between zero and thirty degrees, as well as between one hundred-eighty and two hundred-ten degrees. A second bin can include pixels with flow orientations between thirty and sixty degrees, and between two hundred-ten and two-hundred forty degrees, etc.

The length of each line of the histogram 202 is proportional to the number of pixels with edges at that angle. For example, the lengths of lines 210, 220 indicate the number of pixels within the respective bins. The line 210 is longer than the line 220, indicating that the sixty to ninety degree bin contains more pixels than the one hundred twenty to one hundred fifty degree bin. The remaining bins are empty.

Referring back to FIG. 1, the camera 110 captures a second set of images 132. The second set of images 132 includes an image 130. In the example of FIG. 1, the image 130 is the final sequential image of the second set of images 132.

The second set of images 132 may include consecutive image frames showing one or more moving objects. For example, the image 130 includes depictions of objects that make up the background scene within the field of view of the camera 110, as well as a depiction of a person 114. In the second set of images 132, the person 114 is walking toward the camera 110. The camera 110 may capture the second set of images 132 including the camera image 130, for example, upon one or more of being triggered by a motion sensor that detects the motion of the person 114, as part of a constant capturing of frames, or upon a doorbell button being pressed.

The second set of images 132, including the image 130, also includes depictions of precipitation 125, e.g., rain, sleet, or snow. The precipitation 125 can appear as lines, streaks, or curves, in the image 130. The precipitation is represented in the image 130 by dashed lines.

The camera 110 can perform a precipitation removal process on each image of the second set of images 132 to identify precipitation and remove depictions of the precipitation from each image, as described in detail below. Steps of the precipitation removal process are performed by the edge identifier 126, background comparator 134, precipitation identifier 140, modified pixel data generator 144, and pixel modifier 148.

In some implementations, as illustrated in FIG. 1, the camera 110 can perform one step of the precipitation removal process on each segment of an image, and then perform the next step of the process on each segment. For example, the precipitation identifier 140 can identify precipitation edges in each segment of the image 130, and output the precipitation segments 142 to the modified pixel data generator 144. The modified pixel data generator 144 can then generate modified pixel data 146 for all of the precipitation segments 142. The camera 110 can continue to perform steps the precipitation removal process in sequence on each of the segments of the image 130.

In some implementations, the camera 110 can perform all steps of the precipitation removal process on one segment of an image, and then perform all steps of the precipitation removal process on another segment of the image. For example, the edge identifier 126, background comparator 134, precipitation identifier 140, modified pixel data generator 144, and pixel modifier 148 can process a first segment of the image 130 to remove the depiction of precipitation from the first segment. Then the edge identifier 126, background comparator 134, precipitation identifier 140, modified pixel data generator 144, and pixel modifier 148 can process a second segment of the image 130 to remove the depiction of precipitation from the second segment. The camera 110 can continue to perform all of the steps of the precipitation removal process on individual segments of the image 130.

To remove depictions of precipitation from the image 130, the edge identifier 126 first identifies edges 128 of the image 130. The edge identifier 126 can identify the edges using a process similar to as described above with reference to the background generator 122. The edges 128 include edges of the background objects, the person 114, and the precipitation 125.

The edge identifier 126 can divide the scene into segments, or cells. For example, the edge identifier 126 can overlay the same grid on the image 130 as the background generator 122 overlaid on the image 118. Thus, the image 130 can be divided into the same number, size, and shape of cells as the image 118.

Figure 2B:
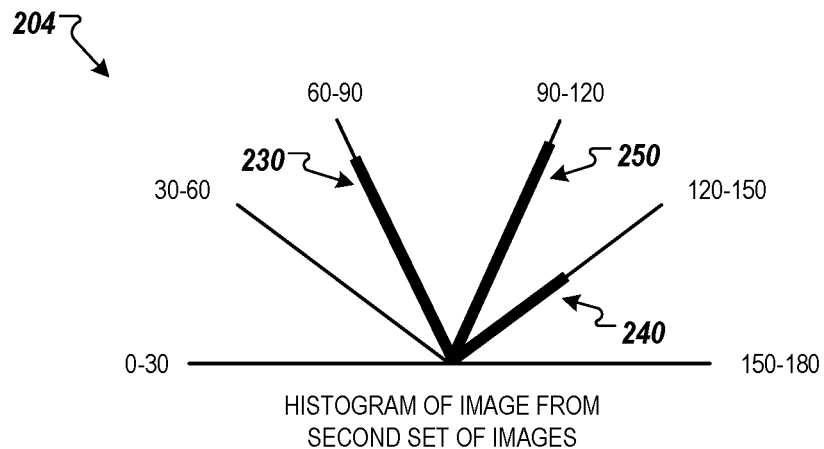

FIG. 2B shows a visualization of the edges 128 of an example image of the second set of images 132. Specifically, FIG. 2B shows an example histogram 204 for the edges in an example cell of the image 130 that corresponds to the example cell of FIG. 2A.

The length of each line 230, 240, 250 of the histogram 204 is proportional to the number of pixels with edges at that angle. The line 230 is longer than the line 240, indicating that the sixty to ninety degree bin contains more pixels than the one hundred twenty to one hundred fifty degree bin. The line 250 is longer than the line 230, indicating that the ninety to one hundred twenty degree bin contains more pixels than the sixty to ninety degree bin. The remaining bins are empty.

The background comparator 134 receives as input the background model 124 and the edges 128 of the image 130. The background comparator 134 can compare the edges of the background model 124 to the edges 128 to output foreground edges 136. Foreground edges 136 of the image 130 are edges that are present in the image 130 and that are not present in the background model 124.

Figure 2C:
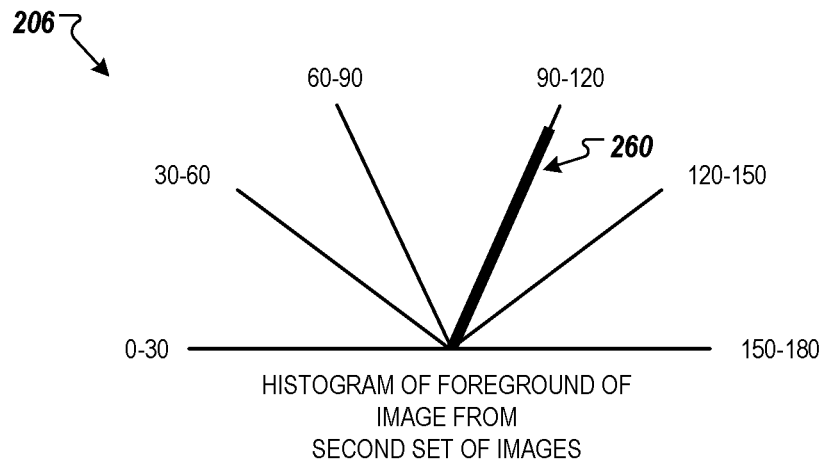

FIG. 2C shows a visualization of the foreground edges 136 of the second set of images 132. Specifically, FIG. 2C shows an example histogram 206 for foreground edges 136 in an example cell of the image 130 that corresponds to the example cell of FIG. 2A and of FIG. 2B.

The histogram 206 is the result of comparing the histogram 202 with the histogram 204. The line 210 of the histogram 202 and the line 230 of the histogram 204 are the same length, indicating that the edge pixels in the sixty to ninety degree bin in the example cell of the image 130 correspond to background edges. Thus, in the histogram 206, the sixty to ninety degree bin is empty.

Similarly, the line 220 of the histogram 202 and the line 240 of the histogram 204 are the same length, indicating that the edge pixels in the one hundred twenty to one hundred fifty degree bin in the example cell of the image 130 correspond to background edges. Thus, in the histogram 206, the one hundred twenty to one hundred fifty degree bin is empty.

In the histogram 202, the ninety to one hundred twenty degree bin is empty. In the histogram 204, the line 250 represents edge pixels in the ninety to one hundred twenty degree bin. Thus, in the histogram 206, which is generated by comparing the histogram 202 and the histogram 204, the line 260 is the same length as the line 250. The line 260 indicates that there are one or more foreground edges 136 of the example cell of the second set of images 132 in the ninety to one hundred twenty degree bin.

The background comparator 134 can output foreground edges 136 for the image 130. The background comparator 134 outputs the foreground edges 136 to the precipitation identifier 140.

The precipitation identifier 140 receives as input the foreground edges 136 for the image 130. The precipitation identifier 140 can use precipitation criteria to identify foreground edges 136 that correspond to precipitation. The precipitation identifier 140 can classify these foreground edges 136 as precipitation edges. The precipitation identifier 140 can also classify segments of the image that include precipitation edges as precipitation segments 142, as described with reference to FIGS. 3A-3D.

FIGS. 3A to 3D illustrate an example process for identifying precipitation segments and determining precipitation intensity. FIGS. 3A-3D show a grid overlaid on an example image of the second set of images 132, e.g., the image 130. The grid includes rectangular cells of equal size. In some examples, the cells can be square shaped. For example, each cell can include a square of four pixels by four pixels, eight pixels by eight pixels, or sixteen pixels by sixteen pixels.

Figure 3A:
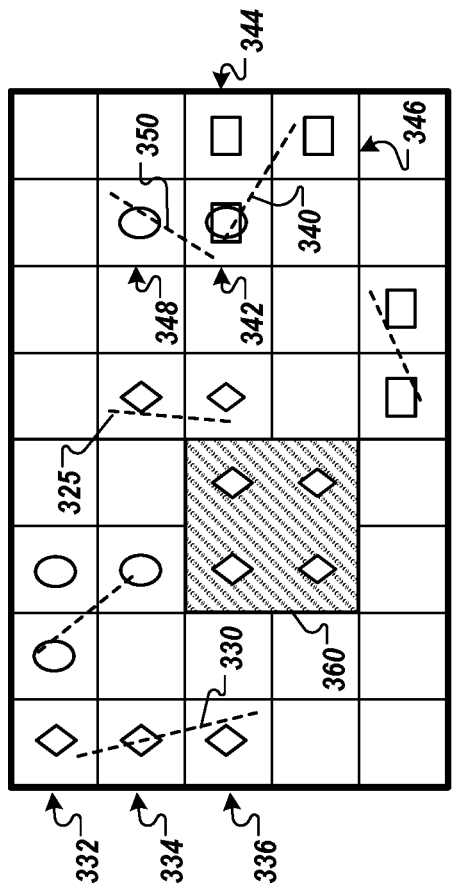
FIGS. 3A to 3D illustrate an example process for identifying precipitation segments and determining precipitation intensity in images.

FIG. 3A shows example edges of the example image. The edges include, for example, tree trunk edges 306 that correspond boundaries between trunks of the trees 106 and the yard 108. The edges also include a horizon edge 308 that corresponds to a boundary between the yard 108 and the sky 105. The edges also include driveway edges 312 that correspond to a boundary between the driveway 112 and the yard 108. The edges also include precipitation edges 325 that correspond to precipitation 125 depicted in the image 130. The edges also include person edges 314 that correspond to a boundary between the person 114 and the driveway 112.

As described with reference to FIG. 1, the edges 128 are identified by the edge identifier 126. The edge identifier 126 can output the edges 128 to the background comparator 134. The background comparator 134 can then identify foreground edges 136 based on comparing the edges 128 with the background model 124.

Figure 3C:
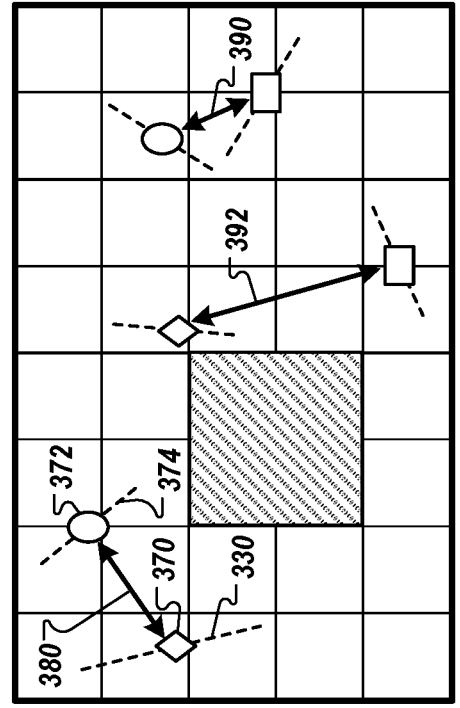
Figure 3B:
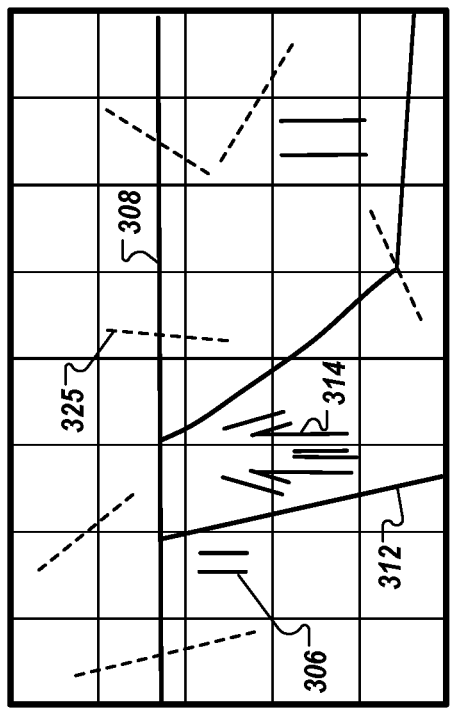

FIG. 3B shows example foreground edges 136 of the example image of FIG. 3A. The foreground edges 136 include, for example, the person edges 314 and the precipitation edges 325. The foreground edges 136 are a selection of the edges 128 that do not correspond with edges of the background model 124.

The background comparator 134 outputs the foreground edges 136 to the precipitation identifier 140. The precipitation identifier 140 can then identify, from the foreground edges 136, a subset of foreground edges 136 that meet criteria for being classified as precipitation edges. The precipitation identifier 140 can classify segments of the image that include the precipitation edges as precipitation segments 142.

FIG. 3C shows example precipitation segments 142 of the example image. The precipitation segments 142 are segments of the image that include precipitation edges 325. In FIG. 3C, segments of the image that include a foreground edge are marked with a symbol. The symbol represents the angle of the edges in the segment.

For example, a diamond symbol marks segments that include an edge in the sixty to ninety degree or ninety to one hundred-twenty degree bin, as illustrated in FIGS. 2A-2C. An elliptical symbol marks segments that include an edge in the thirty to sixty degree bin or one hundred-twenty to one hundred-fifty degree bin. A rectangle marks segments that include an edge in the zero to thirty degree or one hundred-fifty to one hundred-eighty degree bin.

The precipitation identifier 140 can assume that adjacent segments with edges in the same bin include the same edge. For example, the segments 332, 334, 336 are adjacent and each include an edge in the sixty to ninety degree bin. Therefore, each of the segments 332, 334, 336 is marked with a diamond, and the precipitation identifier 140 can assume that each of the segments 332, 334, 336 include the same edge 330.

In some examples, a single segment may include two or more edges that are each in different bins. For example, the segment 342 includes an edge in the zero to thirty-degree bin and an edge in the one hundred twenty to one hundred fifty degree bin. Therefore, the segment 342 is marked with both an ellipse and a rectangle. The precipitation identifier 140 can assume that the segment 342 includes the same edge 350 as the segment 348, as the segments 342, 348 are adjacent and each include an edge in the one hundred twenty to one hundred fifty degree bin. Similarly, the precipitation identifier 140 can assume that the segment 342 includes the same edge 340 as the segments 344, 346, as the segments 342, 344, 346 are adjacent and each include an edge in the one hundred twenty to one hundred fifty degree bin.

The precipitation identifier 140 can identify the precipitation edges 325, and thus precipitation segments 142, based on precipitation criteria. Precipitation criteria for a foreground edge can include, for example, discontinuity of the foreground edge between image frames. For example, a foreground edge that corresponds to precipitation may be visible in a particular image, and might not be visible in a previous image, in a subsequent image, or both. In contrast, an edge that corresponds to an object of interest, e.g., a person, is likely to be visible in multiple sequential images. Thus, foreground edges that have discontinuity between sequential images are more likely to correspond to precipitation than foreground edges that are continuous between sequential images.

Precipitation criteria for a foreground edge can also include contiguity between segments of an image. For example, a foreground edge can meet contiguity criteria if the foreground edge is contiguous between at least two adjacent segments. In some examples, the foreground edge can meet contiguity criteria if the foreground edge is contiguous between adjacent segments along a vertical, horizontal, or diagonal path.

For example, the foreground edge 330 is contiguous between segments 332, 334, 336. The foreground edge 330 has an angle in the sixty to ninety degree bin, therefore the segments 332, 334, 336 are marked with a diamond symbol. The segments 332, 334 and are contiguous along a vertical path. Thus, the precipitation identifier 140 can determine that the foreground edge 330 meets contiguity criteria for being a precipitation edge. Based on the foreground edge 330 meeting criteria for being a precipitation edge, the precipitation identifier 140 can classify the foreground edge 330 as precipitation edge 330.

In another example, the edge 340 is contiguous between segments 342, 344, 346. The segments 342, 344, 346 are marked with a rectangular symbol and are contiguous along a diagonal path. Thus, the precipitation identifier 140 can determine that the edge 340 meets contiguity criteria for being a precipitation edge.

In contrast, an object of interest, e.g., a person, is likely contiguous along segments that form a two dimensional shape, e.g., a rectangle, an ellipse, a trapezoid, or a blob. For example, the person edges 314 are contiguous between segments that form a rectangular shape 360. Thus, the precipitation identifier 140 can determine that the person edges 314 do not meet contiguity criteria for being a precipitation edge. The precipitation identifier 140 can eliminate the segments that form the rectangular shape 360 from consideration as precipitation segments.

The precipitation identifier 140 can classify the segments of the image that include precipitation edges as precipitation segments 142. For example, the precipitation identifier 140 can classify segments 332, 334, and 336 as precipitation segments 142, since the segments 332, 334, and 336 each include the precipitation edge 330. In this way, objects of interest, e.g., people, vehicles, and animals, can be removed from consideration as depictions of precipitation.

The precipitation identifier can output the precipitation segments 142 to the modified pixel data generator 144. The modified pixel data generator 144 can then generate modified pixel data 146 for the precipitation segments 142. In some examples, the modified pixel data generator 144 can generate the modified pixel data 146 based on an intensity of the precipitation.

The modified pixel data generator 144 receives as input the identified precipitation segments 142. The precipitation segments 142 are segments, or cells, that have been identified to include foreground edges that correspond to precipitation. The modified pixel data generator 144 can then generate modified pixel data 146 for the precipitation segments 142.

Figure 3D:
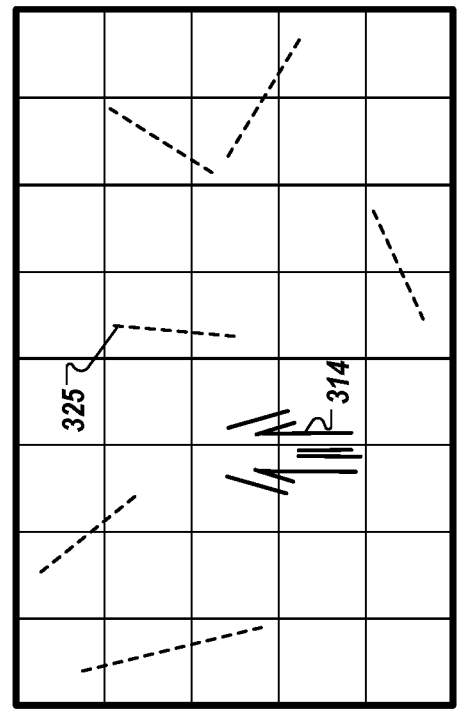

The modified pixel data generator 144 can generate the modified pixel data 146 based on an intensity of the precipitation. FIG. 3D illustrates an example technique for determining the intensity of the precipitation. As illustrated in FIG. 3D, the modified pixel data generator 144 can determine the precipitation intensity based on determining a distance between the precipitation edges.

In some examples, the modified pixel data generator 144 can determine a center of each precipitation edge. For example, the modified pixel data generator 144 can determine a center 370 of the precipitation edge 330. The modified pixel data generator 144 can also determine a center 372 of the precipitation edge 374. The modified pixel data generator 144 can then determine a distance 380 between the center 370 and the center 372. The distance 380 can be measured, for example, in a number of pixels.

For each precipitation edge, the modified pixel data generator 144 can determine a distance between the center of the precipitation edge and the center of the nearest other precipitation edge. The modified pixel data generator 144 can then determine an average distance between centers for all precipitation edges in the image.

The modified pixel data generator 144 can determine the precipitation intensity based on the average, median, or mode distance between centers. In some examples, the modified pixel data generator 144 can compare the average distance between centers to threshold distances or ranges of distances that correspond to precipitation intensity levels.

For example, light precipitation intensity may be defined as an average distance of greater than sixty-four pixels. Moderate precipitation intensity may be defined as an average distance of between thirty-two and sixty-four pixels. Heavy precipitation intensity may be defined as an average distance of less than thirty-two pixels. Thus, if the modified pixel data generator 144 determines an average distance between centers of forty-two pixels, the modified pixel data generator 144 can determine that the precipitation intensity is moderate.

In some examples, the modified pixel data generator 144 can determine the precipitation intensity based on the number or percentage of precipitation segments. For example, as shown in FIG. 3C, fourteen segments out of forty total segments are classified as precipitation segments. Therefore, thirty-five percent of segments are precipitation segments.

The modified pixel data generator 144 can compare the percentage of precipitation segments to threshold percentages or ranges of percentages that correspond to precipitation intensity levels. For example, light precipitation intensity may be defined as at least ten percent of segments being precipitation segments. Moderate precipitation intensity may be defined as at least thirty percent of segments being precipitation segments. Heavy precipitation intensity may be defined as at least fifty percent of segments being precipitation segments. Thus, for the image 130, with thirty-five percent of segments being precipitation segments, the modified pixel data generator 144 can determine that the precipitation intensity is moderate.

The modified pixel data generator 144 can generate the modified pixel data 146 for each precipitation segment 142. For each pixel in the precipitation segment 142, the modified pixel data generator 144 can determine a median original pixel value over a series of previous images. The modified pixel data 146 can then include the median pixel values for each pixel in each precipitation segment 142.

For example, the modified pixel data generator 144 receives, as input, data indicating that the segment 334 is classified as a precipitation segment 142 in the image 130. The modified pixel data generator 144 can select a series of previous images and calculate the median value of each pixel of the precipitation segment 334 over the series of previous images. The series of images can be, for example, images of the second set of images 132 that were captured before the image 130.

The number of images included in the series of previous images can be determined based on the intensity of the precipitation. For example, when the modified pixel data generator 144 determines that the precipitation intensity is light, the series of previous images may include more images than when the modified pixel data generator 144 determines that the precipitation intensity is heavy. As an example, the series of previous images may include seven images in light intensity precipitation, five images in moderate intensity precipitation, and three images in heavy intensity precipitation.

The modified pixel data generator 144 outputs the modified pixel data 146 to the pixel modifier 148. The modified pixel data 146 can include the median pixel value for each pixel in each precipitation segment 142 of the image 130.

The pixel modifier 148 can modify the pixels of the second set of images 132. In some implementations, to modify the pixels of the second set of images 132, the pixel modifier 148 can replace the original pixel data of each pixel of each precipitation segment 142 with the modified pixel data 146 in the image 130.

In some implementations, to modify the pixels of the second set of images 132, the pixel modifier 148 can replace the original pixel data with the modified pixel data 148 for only those pixels in each precipitation segment 142 that are in the precipitation edges. For example, pixels that were identified by the precipitation identifier 140 as representing precipitation can be replaced by the modified pixel data 148. In some examples, pixels that are adjacent to the precipitation edges can also be modified. For example, pixels that are within a threshold pixel distance to pixels that were identified by the precipitation identifier 140 as representing precipitation can be replaced by the modified pixel data 148.

In some implementations, to modify the pixels of the second set of images 132, the pixel modifier 148 can replace the original pixel data with modified pixel data generated from a previous image or from the background model 124. For example, the pixel modifier 148 can replace a segment of the image 130 that was identified as a precipitation segment 142 with the corresponding segment of the background model 124. In another example, the pixel modifier 148 can replace a segment of the image 130 that was identified as a precipitation segment 142 with the corresponding segment of a previous image in which the segment was not identified as a precipitation segment.

In some examples, the pixel modifier 148 can modify the pixels of only the image 130. In some examples, in addition to modifying pixels of the image 130, the pixel modifier 148 can modify pixels of each image of the second set of images 132. In some examples, in addition to modifying pixels of the image 130, the pixel modifier 148 can modify pixels of each image of the series of previous images that were used to calculate the median value. In some examples, the pixel modifier 148 can modify pixels of the image 130 and a number of previous images, e.g., three sequential images immediately preceding the image 130.

For example, the second set of images 132 may include ten images, with the image 130 being the tenth sequential image. The median pixel values may be calculated based on a series of previous images that includes seven of the ten images of the second set of images 132. In some examples, based on identifying the precipitation segments 142 of the image 130, the pixel modifier 148 may modify the pixels of the precipitation segments 142 in only the image 130 or in all ten images of the second set of images 132. The camera 110 can then repeat the process of identifying precipitation segments and modifying pixel data for each image captured by the camera 110.

In some examples, based on identifying the precipitation segments 142 of the image 130, the pixel modifier 148 may modify the pixels of the seven images of the series of previous images. The camera 110 can then repeat the process of identifying precipitation segments and modifying pixel data for each selected series of images, e.g., for each set of seven images captured by the camera 110. The frequency of repetition can thus vary based on precipitation intensity. For example, the camera 110 may repeat the process for each set of seven images captured by the camera 110 in light intensity precipitation, for each set of five images captured by the camera 110 in moderate intensity precipitation, and for each set of three images captured by the camera 110 in heavy intensity precipitation.

In some examples, the pixel modifier 148 may modify the pixels of only the image 130. The camera 110 can then repeat the process of identifying precipitation segments and modifying pixel data for each image captured by the camera 110.

The pixel modifier 148 can output a modified second set of images 152, e.g., to a display, to a video analysis system, or both. By replacing the original pixel data of the precipitation segments with the modified pixel data 146, the pixel modifier 148 can remove or reduce depictions of precipitation in the modified second set of images 152. For example, the depictions of precipitation in the modified second set of images 152 may be less defined or distinct than in the second set of images 132. In some examples, the number of depictions of precipitation in the modified second set of images 152 can be reduced compared to the second set of images 132.

For example, the modified second set of images 152 includes image 150. The image 150 shows depictions of the background and of the person 114. The image 150 does not show depictions of the precipitation 125.

In some examples, the camera 110 may introduce a lag between capturing the second set of images 132 and outputting the modified second set of images 152. For example, the camera 110 can capture the second set of images 132 including, e.g., ten images. The camera 110 can then identify precipitation segments in the final image of the second set of images 132, e.g., the image 130. Based on identifying precipitation in the image 130, the camera 110 can modify the pixel data for each image of the second set of images 132. The camera 110 can then output the modified second set of images 152. The camera 110 can therefore introduce a lag, e.g., of approximately the amount of time to capture and modify the ten images of the second set of images 132.

In some examples, the camera 110 can output the modified second set of images 152 to a video analysis system. The video analysis system can be incorporated into the camera 110, or can be a separate computing system. In some examples, the video analysis system can be a control unit or a monitoring server of a property monitoring system that monitors the property 102.

The video analysis system can perform video analysis on the modified second set of images 152. The video analysis can include, for example, object detection, object recognition, and object tracking. Video analysis can be performed on the modified second set of images 152 with reduced depictions of precipitation, compared to the second set of images 132. Thus, the video analysis accuracy can be improved.

The modified second set of images 152 includes modified image 150. The modified image 150 is a modified version of the image 130. Specifically, the modified image 150 is similar to the image 130 except for the depictions of the precipitation 125. The modified image 150 includes a depiction of the background, including the trees 106, the yard 108, the bush 104, the driveway 112, and the sky 105. The modified image 150 also includes a depiction of the person 114.

In some examples, the modified image 150 might not include any depictions of the precipitation 125. In some examples, the modified image 150 might include reduced depictions of the precipitation 125 compared to the image 130. For example, the modified image 150 can include precipitation streaks that are dimmer or less defined than the precipitation streaks of the image 130. In some examples, the modified image 150 can include fewer precipitation streaks than the image 130.

Though described above as being performed by a particular component of the system 100 (e.g., the camera 110), any of the various control, processing, and analysis operations can be performed by either the camera 110 or another computer system of the system 100. For example, the system 100 may include a control unit at the property 102. The control unit may be configured to monitor and control various sensors and devices at the property 102. The control unit may communicate with the camera 110 and other sensors over a wireless network at the property 102. In some examples, the system 100 may communicate with a remote monitoring server. The control unit, the monitoring server, the camera 110, and/or another computer system can generate the background model 124, identify edges 128, identify precipitation segments 142, etc. For example, the control unit may generate the background model 124 and the camera 110 may identify the edges 128. In another example, the monitoring server may generate the background model, the control unit may identify the edges 128, and the camera may generate the modified pixel data 146.

Figure 4:
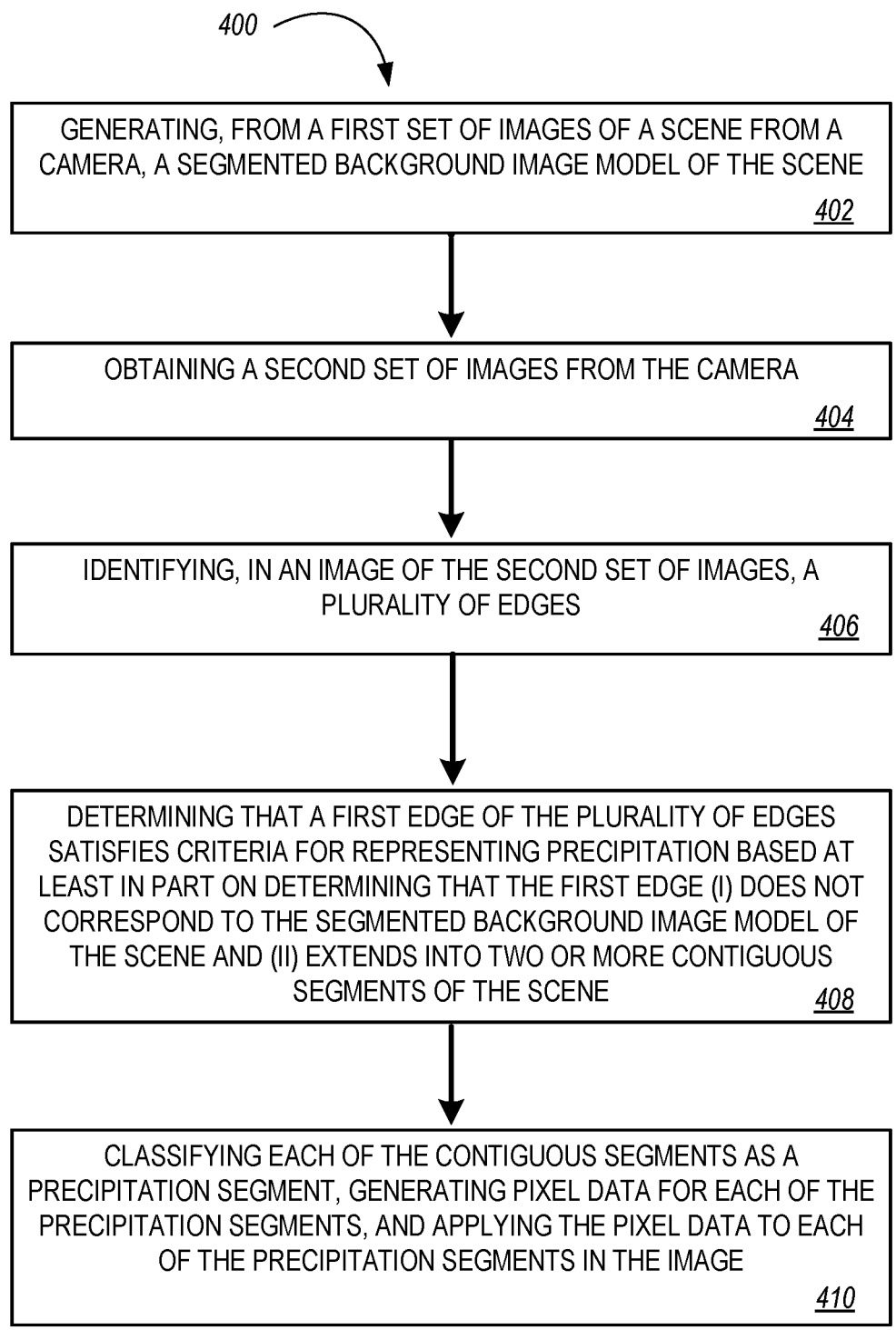
FIG. 4 is a flow chart illustrating an example of a process for precipitation removal from video.

FIG. 4 is a flow chart illustrating an example of a process 400 for precipitation removal from video. The process 400 can be performed by a camera, e.g. the camera 110. In some implementations, the process 400 can be performed by one or more computer systems that communicate electronically with a camera, e.g., a control unit or a monitoring server of a monitoring system.

Briefly, process 400 includes generating, from a first set of images of a scene from a camera, a segmented background image model of the scene (402), obtaining a second set of images from the camera (404), identifying, in an image of the second set of images, a plurality of edges (406), determining that a first edge of the plurality of edges satisfies criteria for representing precipitation based at least in part on determining that the first edge (i) does not correspond to the background image model of the scene and (ii) extends into two or more contiguous segments of the scene (408), and in response to determining that the first edge satisfies criteria for representing precipitation, classifying each of the contiguous segments as a precipitation segment, generating pixel data for each of the precipitation segments, and applying the pixel data to each of the precipitation segments in the image (410).

In additional detail, the process 400 includes generating, from a first set of images of a scene from a camera, a segmented background image model of the scene (402). For example, the camera 110 can capture a first set of images 120. The first set of images 120 can be a set of images that does not include objects of interest or precipitation. The first set of images may include images of one or more background objects in the scene, e.g., of streets, foliage, and buildings. The first set of images may include consecutive images frames, or may be captured at different times. The process 400 can include selecting, for inclusion in the first set of images, a plurality of images that each satisfies image criteria. The image criteria can include at least one of criteria for illumination of the images, criteria for absence of moving objects depicted in the images, or criteria for camera stillness when capturing the images. For example, the camera 110 can select, for inclusion in the first set of images, images that have an illumination level greater than a threshold illumination level. The camera 110 can also select images that do not include any moving objects depicted in the images. The camera 110 can also select images that were captured while the camera 110 remained still and did not undergo a movement drift.

The camera 110 can generate the segmented background image model, e.g., background model 124, based on the first set of images 120. The background model 124 can include, for example, an image model of streets, sidewalks, driveways, fields, or floors.

In some implementations, each image of the first set of images includes a plurality of pixels. Generating the segmented background image model of the scene can include classifying each pixel of the plurality of pixels in the first set of images as representing background or as representing foreground and generating a background image model from the pixels that are classified as representing background, For example, the camera 110 may determine a pixel shows a yard so determine that pixel should be part of the background model 124 and determine another pixel shows a bird so determine that pixel should not be part of the background model 124. The camera 110 can generate the background image model from the pixels that are classified as representing background, e.g., the pixel showing the yard.

In some implementations generating the segmented background image model of the scene can include overlaying the background image model with a grid. The grid can define segments of the segmented background image model of the scene. For example, the camera 110 can segment the background model 124 by dividing the background model into segments, e.g., by overlaying the background image model with a grid. The grid can include rectangular cells of equal or unequal sizes, as shown in FIGS. 3A to 3D.

In some implementations, the segmented background image model of the scene includes identified edges of background objects in the scene. For example, the edges 308 and 312 are identified edges of background objects in the scene of FIG. 3A. The edge 308 corresponds to an edge of the sky, e.g., a horizon, and the edge 312 corresponds to an edge of the driveway 112.

In some implementations, the process 400 includes detecting movement of the camera, and in response to detecting movement of the camera, generating, from a new first set of images, a new segmented background image model of the scene. For example, the camera 110 can detect movement of the camera 110 using, e.g., a SIFT algorithm. In response to detecting movement of the camera 110 to a new orientation, the camera 110 can generate a new segmented background image model of the scene from a new first set of images captured by the camera 110 at its new orientation.

The process 400 includes obtaining a second set of images from the camera (404). For example, the camera 110 can capture the second set of images 132. The second set of images 132 may include consecutive image frames showing one or more moving objects, e.g., the person 114 of the camera image 130. The second set of images 132 can also include depictions of precipitation, e.g., precipitation 125. The second set of images 132 can also include depictions of background objects that correspond to objects of the background model 124. The second set of images 132 can include any number of images, e.g., five images, ten images, twenty images, etc.

The process 400 includes identifying, in an image of the second set of images, a plurality of edges (406). For example, the edge identifier 126 can use edge detection methods to identify edges 128 in the image 130.

In some implementations, identifying the plurality of edges includes identifying boundaries between contrasting pixel values in the image of the second set of images. For example, the edge identifier 126 can identify edges 128 in the image 130 based on identifying boundaries between contrasting pixel values in the image 130. For example, pixels of a depiction of a yard may have low pixel values compared to pixel values of a depiction of sky. The boundary between the lower pixel values of the yard and the higher pixel values of the sky can be identified as an edge.

The process 400 includes determining that a first edge of the plurality of edges satisfies criteria for representing precipitation based at least in part on determining that the first edge (i) does not correspond to the segmented background image model of the scene and (ii) extends into two or more contiguous segments of the scene (408). The background comparator 134 can identify a first edge, e.g., edge 350, that does not correspond to the background model 124 and extends into the two contiguous segments 342 and 348.

In some implementations, determining that the first edge does not correspond to the segmented background image model of the scene includes determining that the first edge does not correspond with any of the identified edges of the background objects of the scene. For example, the background comparator 134 can determine that the edge 325 does not correspond with any of the identified edges of background objects such as horizon edge 308 and driveway edge 312.

In some implementations, determining that the first edge does not correspond with any of the identified edges of the background objects of the scene includes determining that an orientation and a location of the first edge do not correspond with an orientation and location of any of the identified edges. For example, the background comparator 134 can determine that the first edge 323 does not correspond to the background model 124 based on the first edge 323 having an orientation that is not within a same histogram bin of any of the edges of background objects that are located within the same grid segment. For example, the horizon edge 308 has a location that corresponds with the edge 325 due to passing through a common grid cell with the edge 325. However, the horizon edge 308 has an orientation that is not within the same histogram bin as the edge 325. Similarly, driveway edge 312 may have an orientation within the same histogram bin as the edge 325, but does not have a corresponding location due to not passing through any of the same grid cells. Thus, the background comparator 134 can determine that the edge 325 has an orientation and a location that does not correspond with the orientation and location of any of the objects depicted in the background model 124, and therefore does not correspond with any of the identified edges of the background objects of the scene.

In some implementations, determining that the first edge satisfies the criteria for representing precipitation includes determining that the first edge extends into two or more contiguous segments of the scene along a straight line path. For example, the precipitation identifier 140 can determine that the edge 350 extends into two or more contiguous segments of the scene, e.g., segments 342 and 348. Segments 342 and 348 are contiguous along a straight line vertical path. Thus, the precipitation identifier 140 can determine that the edge 350 satisfies criteria for representing precipitation. In contrast, edges 314 of the person 114 extend into segments that are contiguous in a polygonal shape, e.g.

a rectangular shape 360. Thus, the precipitation identifier 140 can determine that the edges 314 do not satisfy the criteria for representing precipitation.

In some implementations, determining that the first edge satisfies the criteria for representing precipitation includes determining that the first edge is identified in fewer than all of the second set of images. For example, the edge 350 may satisfy criteria by being visible in one image of the second set of images, and by not being visible in any of the other images of the second set of images. In some examples, the edge 350 may satisfy criteria by being visible in an image of the second set of images, and by not being visible in the immediately preceding image, the immediately succeeding image, or both.

The process 400 includes in response to determining that the first edge satisfies criteria for representing precipitation, classifying each of the contiguous segments as a precipitation segment, generating pixel data for each of the precipitation segments, and applying the pixel data to each of the precipitation segments in the image (410). For example, the precipitation identifier 140 can classify each of the segments 342, 348 as a precipitation segment 142. The modified pixel data generator 144 can generate the modified pixel data 146 for each of the precipitation segments 142.

In some implementations, generating the pixel data for a precipitation segment includes determining an average pixel value over a series of previous images for each pixel in the precipitation segment. For example, the modified pixel data generator 144 can generate pixel data for each of the precipitation segments 142, e.g., by averaging pixel data for a series of previous images. In some implementations, the average pixel value for pixels in the first edge may be determined from only the values of pixels, located where the first edge was located, in the previous images that did not show a corresponding edge in the series of previous images. For example, the modified pixel data generator 144 may identify that out of the five most recent prior images, two showed an edge corresponding to the first edge and three did not, and, in response, for each pixel in the first edge, generate an average pixel value from the values of pixels at the same position in the three prior images that did not show a corresponding edge.

In some implementations, the series of previous images includes a number of sequential images captured by the camera. For example, the modified pixel data generator 144 can select a series of previous images and calculate the median value of each pixel of the precipitation segments over the series of previous images that were captured before the image 130. In some examples, the series of previous images can include a sequential series of images immediately preceding the image 130.

In some implementations, the process 400 can include selecting the number of sequential images based on the intensity of weather precipitation. For example, the modified pixel data generator 144 can select four sequential images in heavy precipitation, eight sequential images in moderate precipitation, and twelve sequential images in light precipitation.

The process 400 can include, in response to determining that the first edge satisfies criteria for representing precipitation, determining an intensity of weather precipitation. For example, the modified pixel data generator 144 can determine precipitation intensity based on a number of precipitation segments in the image, based on a percentage of segments of the image that are classified as precipitation segments, or based on an average proximity of precipitation edges to other precipitation edges.

In some implementations, determining the intensity of weather precipitation is based on a percentage of segments of the image that are classified as precipitation segments. For example, the modified pixel data generator 144 can determine that six out of segments, or ten percent of segments of the image are classified as precipitation segments. Based on ten percent of segments of the image being classified as precipitation segments, the modified pixel data generator 144 may determine an intensity of weather precipitation of light precipitation. In an example with seventy percent of segments being classified as precipitation segments, the modified pixel data generator 144 may determine an intensity of weather precipitation of heavy precipitation.

In some implementations, determining the intensity of weather precipitation is based on an average proximity of precipitation edges to other precipitation edges in the image. For example the proximity of a first precipitation edge to a second precipitation edge can be determined by measuring a distance between centers of the first and second precipitation edges. For example, the center 370 of a first precipitation edge 330 and the center 372 of a second precipitation edge 374 are separated by a distance 380.

The average proximity of precipitation edges to other precipitation edges can be determined, for example, by averaging the distance 380, the distance 390, and the distance 392. In some examples, the proximity between edges can be measured from a first precipitation edge to a nearest precipitation edge. In some examples, the proximity between edges can be measured from a first precipitation edge to all other precipitation edges within a threshold distance.

In some implementations, applying the pixel data to each of the precipitation segments in the image includes applying the pixel data to a number of images of the second set of images including the image. For example, the pixel modifier 148 can apply the pixel data to the image 130 and to a number of images captured prior to the image 130, e.g., a number of images immediately preceding the image 130. In some examples, the process 400 includes selecting the number of images of the second set of images to apply the pixel data based on the intensity of weather precipitation. For example, when the precipitation intensity is heavy, the pixel modifier 148 can select a fewer number of images, e.g., five images, than when the precipitation intensity is light, e.g., fifteen images.

In some implementations, applying the pixel data to each of the precipitation segments in the image includes replacing a pixel value of each pixel in the precipitation segment with the average pixel value. For example, the pixel modifier 148 can apply the pixel data to the precipitation segments by replacing pixel data in precipitation segments of the image 130 with modified pixel data 146.

Applying the pixel data to each of the precipitation segments in the image 130 can remove or reduce depictions of precipitation in the image 130. Removing or reducing precipitation from video images can reduce false positive alerts with video analysis that may be triggered by depictions of precipitation. Removing precipitation from video images can also improve object detection and tracking using video analysis. Removing precipitation from video images can also improve the appearance of the images when viewed by a user.

Figure 5:
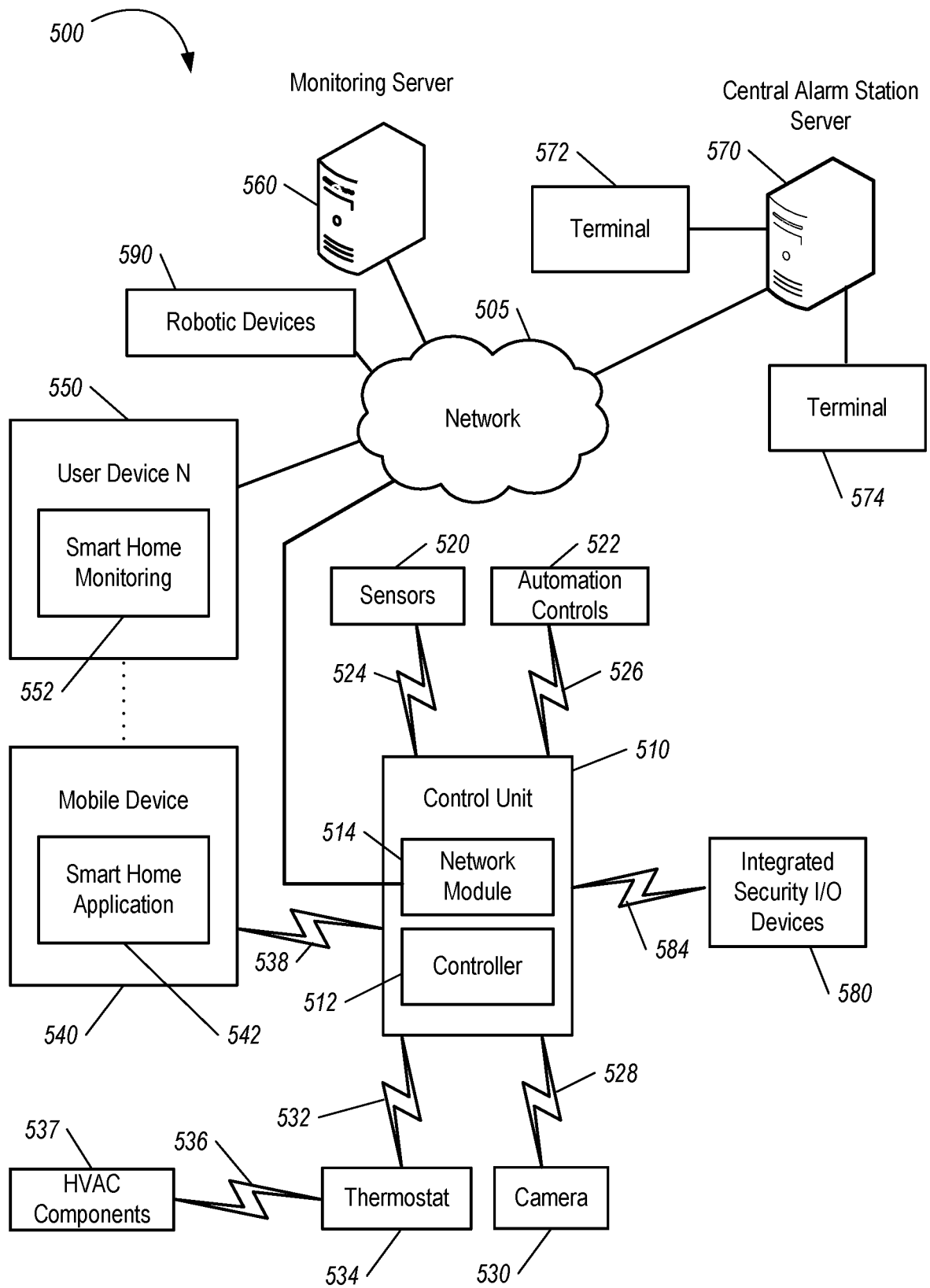
FIG. 5 is a diagram illustrating an example of a home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR)

motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580.

Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500. For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   generating, from a first set of images of a scene from a camera, a segmented background image model of the scene;
   overlaying the segmented background image model with a grid, wherein the grid defines segments of the segmented background image model of the scene;
   obtaining a second set of images from the camera;
   identifying, in an image of the second set of images, a plurality of edges;
   determining that a first edge of the plurality of edges satisfies criteria for representing precipitation based at least in part on determining that the first edge (i) does not correspond to the segmented background image model of the scene and (ii) extends into two or more contiguous segments of the segmented background image model of the scene defined by the grid;
   in response to determining that the first edge satisfies the criteria for representing the precipitation:
   classifying each of the contiguous segments as a precipitation segment;
   generating pixel data for each of the precipitation segments; and
   applying the pixel data to each of the precipitation segments in the image.

2. The method of claim 1, wherein determining that the first edge satisfies the criteria for representing the precipitation includes determining that the first edge is identified in fewer than all of the second set of images.

3. The method of claim 1, wherein determining that the first edge satisfies the criteria for representing the precipitation includes determining that the first edge extends into the two or more contiguous segments of the segmented background image model of the scene along a straight line path.

4. The method of claim 1, wherein each image of the first set of images comprises a plurality of pixels, and generating the segmented background image model of the scene comprises:
   classifying each pixel of the plurality of pixels in the first set of images as representing background or as representing foreground; and
   generating a background image model from the pixels that are classified as representing the background.

5. The method of claim 1, comprising, in response to determining that the first edge satisfies the criteria for representing the precipitation, determining an intensity of weather precipitation.

6. The method of claim 5, wherein determining the intensity of weather precipitation is based on a percentage of segments of the image that are classified as precipitation segments.

7. The method of claim 5, wherein determining the intensity of weather precipitation is based on an average proximity of precipitation edges to other precipitation edges in the image.

8. The method of claim 5, wherein applying the pixel data to each of the precipitation segments in the image comprises applying the pixel data to a number of images of the second set of images, wherein the number of images of the second set of images includes the image, the method comprising:

selecting the number of images of the second set of images to apply the pixel data based on the intensity of weather precipitation.

9. The method of claim 5, wherein generating the pixel data for a precipitation segment comprises determining an average pixel value over a series of previous images for each pixel in the precipitation segment.

10. The method of claim 9, wherein the series of previous images includes a number of sequential images captured by the camera, the method comprising selecting the number of sequential images based on the intensity of weather precipitation.

11. The method of claim 9, wherein applying the pixel data to each of the precipitation segments in the image comprises:

replacing a pixel value of each pixel in the precipitation segment with the average pixel value in the image.

12. The method of claim 1, wherein identifying the plurality of edges comprises identifying boundaries between contrasting pixel values in the image of the second set of images.

13. The method of claim 1, wherein the segmented background image model of the scene includes identified edges of background objects in the scene.

14. The method of claim 13, wherein determining that the first edge does not correspond to the segmented background image model of the scene comprises determining that the first edge does not correspond with any of the identified edges of the background objects of the scene.

15. The method of claim 14, wherein determining that the first edge does not correspond with any of the identified edges of the background objects of the scene comprises determining that an orientation and a location of the first edge do not correspond with an orientation and a location of any of the identified edges.

16. The method of claim 1, comprising selecting, for inclusion in the first set of images, a plurality of images that each satisfy image criteria, the image criteria comprising at least one of criteria for illumination of the images, criteria for absence of moving objects depicted in the images, or criteria for camera stillness when capturing the images.

17. The method of claim 1, comprising:
detecting movement of the camera; and
in response to detecting the movement of the camera, generating, from a new first set of images, a new segmented background image model of the scene.

18. A system comprising one or more computers configured to perform operations comprising:
generating, from a first set of images of a scene from a camera, a segmented background image model of the scene;
overlaying the segmented background image model with a grid, wherein the grid defines segments of the segmented background image model of the scene;
obtaining a second set of images from the camera;
identifying, in an image of the second set of images, a plurality of edges;
determining that a first edge of the plurality of edges satisfies criteria for representing precipitation based at least in part on determining that the first edge (i) does not correspond to the segmented background image model of the scene and (ii) extends into two or more contiguous segments of the segmented background image model of the scene defined by the grid;
in response to determining that the first edge satisfies the criteria for representing the precipitation:
classifying each of the contiguous segments as a precipitation segment;
generating pixel data for each of the precipitation segments; and
applying the pixel data to each of the precipitation segments in the image.

19. A non-transitory computer-readable medium storing software comprising instructions executable by one or more computers which, upon such execution, cause the one or more computers to perform operations comprising:
generating, from a first set of images of a scene from a camera, a segmented background image model of the scene;
overlaying the segmented background image model with a grid, wherein the grid defines segments of the segmented background image model of the scene;
obtaining a second set of images from the camera;
identifying, in an image of the second set of images, a plurality of edges;
determining that a first edge of the plurality of edges satisfies criteria for representing precipitation based at least in part on determining that the first edge (i) does not correspond to the segmented background image model of the scene and (ii) extends into two or more contiguous segments of the segmented background image model of the scene defined by the grid;
in response to determining that the first edge satisfies the criteria for representing the precipitation:
classifying each of the contiguous segments as a precipitation segment;
generating pixel data for each of the precipitation segments; and
applying the pixel data to each of the precipitation segments in the image.

* * * * *